(12) United States Patent
Feild et al.

(10) Patent No.: US 8,903,845 B2
(45) Date of Patent: Dec. 2, 2014

(54) SYSTEMS AND METHODS FOR PROVIDING SEARCH ASSISTANCE TECHNOLOGIES BASED ON USER SELF-EFFICACY AND SEARCH FRUSTRATION

(75) Inventors: Henry Feild, Amherst, MA (US); Omer Emre Velipasaoglu, San Francisco, CA (US); Benoit Dumoulin, Palo Alto, CA (US); Elizabeth F. Churchill, San Francisco, CA (US); Rosemary Jones, Cambridge, MA (US); Jeffrey Bardzell, Bloomington, IN (US)

(73) Assignee: Yahoo! Inc., Sunnyvale, CA (US)

( * ) Notice: Subject to any disclaimer, the term of this patent is extended or adjusted under 35 U.S.C. 154(b) by 260 days.

(21) Appl. No.: 12/978,261

(22) Filed: Dec. 23, 2010

(65) Prior Publication Data

US 2012/0166467 A1  Jun. 28, 2012

(51) Int. Cl.
*G06F 17/30* (2006.01)
(52) U.S. Cl.
CPC .............................. *G06F 17/30867* (2013.01)
USPC ......................................................... 707/768

(58) Field of Classification Search
CPC ..................... G06F 17/30864; G06F 17/30867
USPC .......................................................... 707/768
See application file for complete search history.

(56) References Cited

U.S. PATENT DOCUMENTS

2009/0282021 A1* 11/2009 Bennett ............................ 707/5
2010/0131902 A1*  5/2010 Teran et al. .................. 715/843

* cited by examiner

*Primary Examiner* — Khanh Pham
*Assistant Examiner* — Johnese Johnson
(74) *Attorney, Agent, or Firm* — James J. DeCarlo; Greenberg Traurig, LLP

(57) ABSTRACT

The present invention is directed towards systems and methods for providing search assistance technologies based on a user's search self-efficacy and search frustration. The method according to one embodiment of the present invention comprises receiving a search query from a user. The method then calculates the user's search self-efficacy and calculates the user's frustration with the current information task. The method then identifies a plurality of search assistance technologies based on the user's search self-efficacy and frustration. Finally, the method provides a search engine results page comprising a plurality of search results and the identified plurality of search assistance technologies.

19 Claims, 3 Drawing Sheets

SYSTEMS AND METHODS FOR PROVIDING SEARCH ASSISTANCE TECHNOLOGIES BASED ON USER SELF-EFFICACY AND SEARCH FRUSTRATION

COPYRIGHT NOTICE

Portions of the disclosure of this patent document contain material that is subject to copyright protection. The copyright owner has no objection to the facsimile reproduction by anyone, as it appears in the Patent and Trademark Office patent files or records, but otherwise reserves all copyright rights whatsoever.

FIELD OF THE INVENTION

Embodiments of the invention described herein generally relate to providing search assistance technologies based on a user's search self-efficacy and search frustration. More specifically, embodiments of the present invention describe systems and methods for analyzing user interaction with a search engine results page and identifying the most effective search assistance technologies for display on the search engine results page.

BACKGROUND OF THE INVENTION

As the Internet continues to expand exponentially, the role of search engines has dramatically increased. The sheer volume of data has quickly become impossible for a human user to manipulate on his or her own without computerized assistance. Thus, the use of search engine technology has become a vital tool in the useful operation of the Internet.

Search engines have made great strides in optimization with respect to the quality of results returned in response to a given query. Currently, existing algorithms typically allow users to identify relevant websites within seconds of submitting a query. Despite these advances, however, search engines have made very little advances with respect to analyzing specific or aggregate user behavior and providing search assistance technologies to existing search engines.

Currently, many search engines take a "one size fits all" approach to providing search assistance technologies. For example, search engines often provide "search suggestions" as a default setting. In this environment, a search engine bombards a user with search suggestions for every query and for every search session. While search suggestions may be useful for some users, however, they may be useless for others. For example, users who are highly adept at utilizing a search engine may find the search suggestions to be a distraction, as opposed to providing additional useful information for shaping subsequent search queries. Thus, the "one size fits all" approach ignores the specific aspects of the searching user.

Often, the user's only recourse is to disable the search assistance technologies. While this may rectify the above-described problem, it is a classic example of burning the house to roast the pig. Specifically, while the intelligent searcher described above may normally not have a need for search suggestions, there may be a time when he or she desires such suggestions, or is unaware of a specific context in which he or she may benefit from one or more search assistance technologies. For example, if the searcher is researching an area with which he or she does not have significant familiarity, search suggestions may prove useful. In this example, a user may execute a plurality of unsuccessful searches, and may eventually concede defeat. In the best-case scenario, he or she may manually turn on search suggestions; however, this outcome is unlikely. Therefore, the user is left executing multiple fruitless searches until, ideally, he or she identifies one or more documents of interest.

As can be seen, the primary shortcoming of the state of the art is the failure to utilize the wealth of metrics obtained from a searching user (or across a group of users in the aggregate) to provide effective search assistance technologies. Thus, there exists a need in the art to provide highly effective search assistance technologies on the basis of a given user's search efficacy and current frustration.

SUMMARY OF THE INVENTION

The present invention is directed towards systems and methods for providing search assistance technologies based on a user's search self-efficacy and search frustration. In one embodiment, a method receives a search query from a user and calculates the user's search self-efficacy. In one embodiment, calculating the user's search self-efficacy comprises analyzing a model based on indicators derived from the user's search and browsing patterns. In one embodiment, the user's search and browsing patterns comprise the user's overall search and browsing patterns. In an alternative embodiment, the user's search and browsing patterns comprise the user's search and browsing patterns for a current information task.

The method then calculates the user's frustration with the current information task. In one embodiment, calculating the user's frustration with the current information task comprises one or more of calculating the average number of URLs visited per information-seeking task by a user; calculating the number of actions performed in the current task; calculating the number of characters in the current query; calculating the average length of search terms in the current query; or calculating the duration of the current information-seeking task.

The method then identifies a plurality of search assistance technologies based on the user's search self-efficacy and frustration. In one embodiment, identifying a plurality of search assistance technologies based on the user's search self-efficacy and frustration further comprises identifying a plurality of search assistance technologies based on ancillary task metrics. In one embodiment, ancillary task metrics comprise one or more of the type of query, number of queries issued so far, time between queries.

The method then provides a search engine results page comprising a plurality of search results and the identified plurality of search assistance technologies. In alternative embodiments, the user's search self-efficacy and frustration are calculated based on user metrics collected from a user's previous interactions with a search engine results page. In one embodiment, the user metrics are collected from a user's previous interactions with a search engine results page are collected by one of a client side browser extension, a web proxy, or a web server.

The present invention is further directed towards a system comprising a plurality of client devices coupled to a network and a search engine coupled to the network operative to receive a search query from a client device. The system further comprises an efficacy and frustration calculator operative to calculate the user's search self-efficacy and calculate the user's frustration with the current information task.

In one embodiment, the efficacy and frustration calculator is further operative to calculate a user's search self-efficacy by analyzing a model based on indicators derived from the user's search and browsing patterns. In a first embodiment, the user's search and browsing patterns comprises the user's overall search and browsing patterns. In a second embodiment, the user's search and browsing patterns comprises the user's search and browsing patterns for a current information task. In an alternative embodiment, the efficacy and frustration calculator is further operative to calculate a user's frustration with the current information task by calculating one or more of the average number of URLs visited per information-seeking task by a user; calculating the number of actions performed in the current task; calculating the number of characters in the current query; calculating the average length of search terms in the current query; or calculating the duration of the current information-seeking task.

The system further includes a search assistance application storage module operative to store a plurality of search assistance applications and a search assistance suggestion server operative to identify a plurality of search assistance technologies based on the user's search self-efficacy and frustration. In one embodiment, the search assistance suggestion server is further operative to identify a plurality of search assistance technologies based on ancillary task metrics stored in a user metric storage module. In one embodiment, the ancillary task metrics stored within the user metric storage module comprise one or more of the type of query, number of queries issued so far, time between queries.

The system further comprises a web server operative to provide a search engine results page comprising a plurality of search results and the identified plurality of search assistance technologies. In alternative embodiments, the efficacy and frustration calculator calculates a user's search self-efficacy and frustration based on user metrics collected from a user's previous interactions with a search engine results page. In one embodiment, the search engine collects user metrics from a user's previous interactions with a search engine results page are collected by one of a client side browser extension, a web proxy, or a web server.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
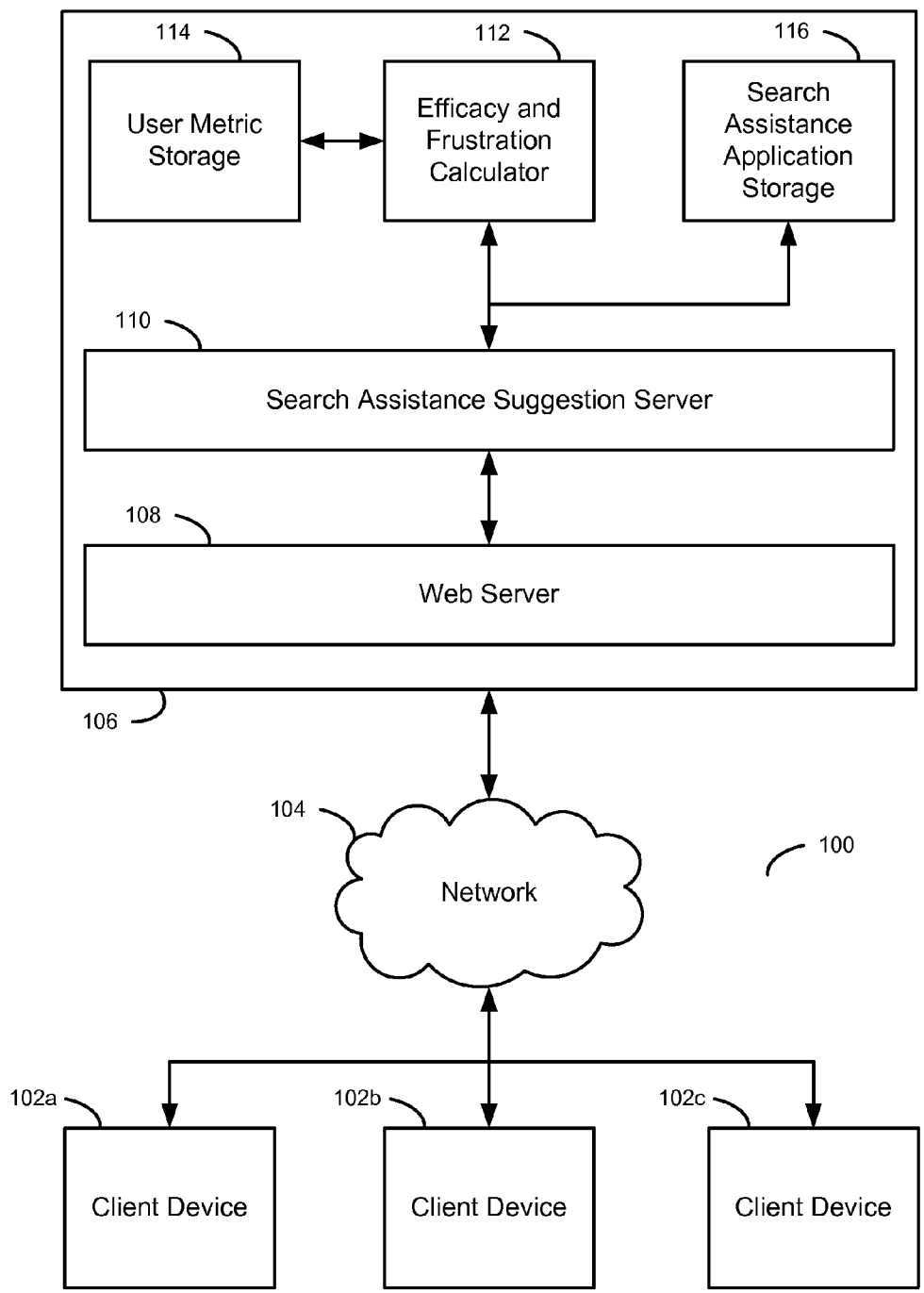
FIG. 1 presents a block diagram depicting a system for providing search assistance technologies on the basis of user self-efficacy and search frustration according to one embodiment of the present invention.

FIG. 1 presents a block diagram depicting a system for providing search assistance technologies on the basis of user self-efficacy and search frustration according to one embodiment of the present invention. According to the embodiment that FIG. 1 illustrates, a system 100 comprises a plurality of client devices 102a, 102b, and 102c connected to a search engine 106 via a network 104. Search engine 106 comprises a web server 108, search assistance suggestion server 110 ("suggestion server"), efficacy and frustration calculator 112, user metric storage 114, and search assistance application storage 116.

Although illustrated as single, discrete components, alternative embodiments exist wherein the system 100 integrates or distributes the illustrated components across multiple hardware devices. In alternative embodiments, the system 100 may geographically distribute the devices in addition to physically distributing the devices. The search engine 106, and its components, may be any suitable physical processing device performing processing operations as described herein, in response to executable instructions. For example, search engine 106, and its components, may comprise a plurality of redundant server devices. The user metric storage 114 and search assistance application storage 116 may comprise any suitable type of storage device operative to store electronic data therein in a structured manner. For example, the user metric storage 114 and search assistance application storage 116 may comprise a RDMS stored on a RAID storage system comprising a plurality of hard disks.

In the illustrated embodiment, a plurality of client devices 102a, 102b, and 102c are operative to transmit and receive data to and from search engine 106, e.g., transmit search queries to the search engine 106 and receive one or more search engine result pages as response. In the illustrated embodiment, client devices 102a, 102b, and 102c may comprise a plurality of computing devices such as personal, general-purpose computers, handheld devices, or any other device operative to transmit data. Network 106 may comprise various networking embodiments such as a WAN, LAN, LTE, 3G, EDGE, or any network medium facilitating data transmissions between devices.

In the illustrated embodiment, client devices 102a, 102b, and 102c transmit search requests to search engine 106. In one embodiment, search requests contain textual query strings embedded within an HTTP request, or similar transport means. Client devices 102a, 102b, and 102c transmit search requests by utilizing an HTML form, or similar element, present on a search engine webpage provided by the search engine 106. In response to receiving a search request, web server 108 queries a search index (not shown) and identifies one or more relevant webpages. Web server 108 additionally generates a search engine results page ("SERP") that presents the identified webpages to the user. In generating the SERP, the search engine 106 may also supplement the listing of links to one or more relevant web pages with one or more advertisements, which may be targeted to the user, the query or various combinations thereof.

In addition to providing a SERP, web server 108 is further operative to present one or more search assistance applications to the requesting client device 102a, 102b, and 102c. In one embodiment, the web server 108 embeds search assistance applications into the SERP so the SERP presents the applications simultaneously or otherwise in conjunction with the search results. The following pending U.S. patent applications regarding the inclusion of applications in a SERP are hereby incorporated by reference in their entirety: U.S. Ser. No. 11/863,383, filed on Sep. 28, 2007, entitled "System And Method For Inclusion Of History In A Search Results Page", U.S. Ser. No. 12/199,138, filed on Aug. 27, 2008, entitled "System And Method For Assisting With Vertical Suggestions"; and U.S. Ser. No. 12/365,881, filed on Feb. 4, 2009, entitled "Systems And Methods For A Search Engine Results Page Research Assistant". To provide a given search assistance application, web server 108 transmits data regarding the search request and information need to the suggestion server 110. In one embodiment, web server 108 transmits data relating to the query to the suggestion server 110 including, but not limited to, the type of query, the number of queries issued by the user, and the elapsed time between user queries.

Alternatively, or in conjunction with the foregoing, web server 108 transmits data representing an information need of the user. An information need of the user may comprise the search goal of the user. In response to this data, the suggestion server 110 may analyze the data to identify the information need of the user. To identify a search goal or information need, the suggestion server 110 may identify a plurality of queries that occur in quick succession and relate to a particular topic of interest. For example, if a user enters the queries "New York", "plane tickets", and "hotels in NYC" within a defined time interval, the suggestion server 110 may identify the user's informational need as "travel to New York city" or "vacation in New York City." Thus, according to one embodiment, the information need of a user corresponds to a high-level representation of that which the user is attempting to find.

To provide the user with the most effective search assistance technologies, the search engine 106 calculates the search self-efficacy and search frustration of the user via efficacy and frustration calculator 112. In the illustrated embodiment, search self-efficacy corresponds to the overall confidence a user has in his or her ability to effectively, and efficiently, search for an information need. In the illustrated embodiment, search frustration corresponds to the level of frustration a user is feeling with respect to searching for an information need. Efficacy and frustration calculator 112 may calculate these values on the basis of indicators derived from the user's search and browsing patterns stored in user metric storage 114. For example, the efficacy and frustration calculator 112 may calculate the search frustration of a user on the basis of a plurality of indicators including, but not limited to, the average number of URLs visited per information-seeking task by a user; the number of actions performed in the current task; the number of characters in the current query; the average length of search terms in the current query; and/or the duration of the current information-seeking task). In accordance with alternative embodiments, the efficacy and frustration calculator 112 may utilize action sequences of the user in calculating the search self-efficacy and search frustration of the user.

Continuing with the embodiment illustrated by FIG. 1, web server 106 may populate data stored in the user metric storage 114 through the use of plurality techniques well known to those of skill in the art. In one embodiment, the web server 106 utilizes a client-side browser extension to capture user interactions for an information-seeking session. Such an implementation may be accomplished via a browser toolbar, or similar mechanism. In an alternative embodiment, the web server 106 may utilize a web proxy wherein all pages viewed by a user are passed through a proxy that injects JavaScript, allowing clicks and mouse movements to be captured. In a third embodiment, the web server 106 may only monitor those actions that are recorded at the web server 108, such as a user selecting a hyperlink or submitting a search request. In accordance with this data, efficacy and frustration calculator 112 may identify one or more search assistance applications stored in search assistance application storage 116 that are the most effective applications vis-à-vis the user's efficacy and current frustration. Search assistance application storage 116 may comprise a plurality of applications (which may be web-based applications) aimed at increasing the ability of a searching user to locate relevant webpages, examples of which are given herein.

Search assistance application storage 116 may contain a "query suggestions" application. A query suggestions application is operative to generate a plurality of suggested searches on the basis of a given query. Search assistance application storage 116 may additionally contain a Sneak-Peek application that show the user the top N results for each query suggestion in a set of query suggestions. Search assistance application storage 116 may additionally contain a "result summary clusters application" operative to cluster search results together based on result summary similarity. The following pending U.S. patent applications regarding clustering are hereby incorporated by reference in their entirety: U.S. Ser. No. 11/863,416, filed on Sep. 28, 2007, entitled "System And Method For History Clustering", and U.S. Ser. No. 12/910,911, filed on Oct. 25, 2010, entitled "System And Method For Providing Topic Cluster Updates". The SneakPeek application may only show the highest ranked result in a cluster, with an option to show the others, which are indented below the head result. Search assistance application storage 116 may additionally contain a "query editor" application operative to provide an interactive display of the query that allows the user to modify a query by selecting individual term suggestions from a drop down list associated with words or phrases in the query. Search assistance application storage 116 may additionally contain an "add popular terms" application operative to display a panel listing the most common key terms associated with the top results returned; these can be selected and added to the query. Search assistance application storage 116 may additionally contain a "remove popular terms" application operative that displays a list suggesting of popular terms that can be avoided.

After identifying the most effective search assistance applications, suggestion server 110 may provide any identified applications to web server 108. In the illustrated embodiment, web server 108 combines the applications with the previously identified search results to form a SERP comprising both search results and the identified applications. After generating the SERP, the web server 108 transmits the SERP to the requesting client device 102a, 102b, 102c.

Figure 2:
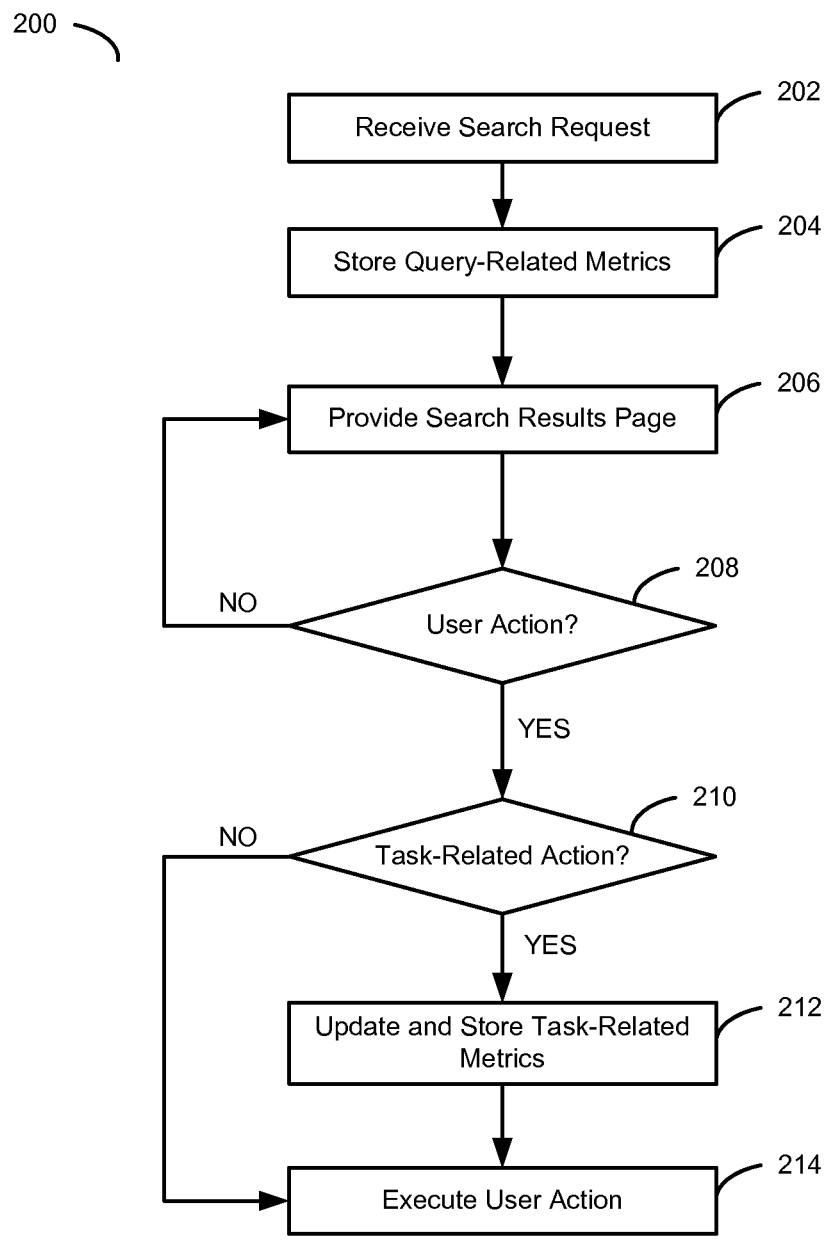
FIG. 2 presents a flow diagram illustrating a method for collecting user metrics regarding interaction with a search engine results page according to one embodiment of the present invention.

FIG. 2 presents a flow diagram illustrating a method 200 for collecting user metrics with regard to user interaction with a search engine results page according to one embodiment of the present invention. As the embodiment of FIG. 2 illustrates, the method 200 receives a search request, step 202. In one embodiment, receiving a search request comprises a textual request for data in the form of a query string or POST HTTP header data.

In response to a received query, the method 200 stores query-related metrics, step 204. In the illustrated embodiment, query-related metrics comprise data specific to the query such as the type of query, the number of queries issued so far in a given information retrieval session, the elapsed time between queries (average, aggregate, etc.), the number of characters in the current or previous queries, etc. Query-related metrics may be stored on a per-user basis. As previously discussed, the method 200 may store the query-related metrics in a persistent data store such as a permanent storage device located at a search engine.

The method 200 provides a search engine results page, step 206. As discussed previously, the SERP may comprise a listing of links to relevant webpages, as is known in the art. According to one embodiment, the method 200 may provide only search results (and advertisement) and not applications in step 206, however, in alternative, the method 200 may additionally present applications as described in detail herein with respect to FIG. 3. After providing the SERP to the requesting client device, the method 200 determines if a user action has taken place, step 208. As previously discussed, monitoring a SERP for a user action may comprise utilizing a browser toolbar, or similar mechanism. In an alternative embodiment, the method 200 may utilize a web proxy wherein all pages viewed by a user are passed through a proxy that injects JavaScript, allowing clicks and mouse movements to be captured. In accordance with other embodiments, the method 200 may only monitor those actions that are recorded at the web server, such as a user selecting a hyperlink or submitting a search request. If the method 200 does not detect a user action, the method 200 continues to display the SERP, step 206.

If the method 200 detects a user action, the method 200 determines if the action is a task-related action, step 210. In the illustrated embodiment, a task-related action may be dependent on the specific task. For example, in some embodiments, the method 200 may not determine that clicking an advertisement on the SERP a task-related action where the task is attempting to find a research paper. In this example, the user's selection of an advertisement is not directly related to the task and is thus not considered a task-related action. In contrast, if a user's task is to identify hotels in a particular geographical region, the selection of advertisements may be a task-related action. In this example, advertisements may be directed towards hotels in the area the user is searching for, thus the selection of such an advertisement is directly related to the task.

If the method 200 determines that the action is not a task-related action, the method 200 simply executes the user action, step 214. If the method 200 determines that the action is a task-related action, the method 200 updates and stores the task-related metrics, step 212. In one scenario, the method 200 simply stores an indication of the action that took place. For example, the method 200 may record that action of entering a third new search within a given time window, which may indicate frustration. In an alternative embodiment, the method 200 updates existing task-related metrics. For example, the method 200 may update the average number of URLs visited per information-seeking task by a user; update the number of actions performed in the current task; calculate the duration of the current information-seeking task, etc. After the method 200 stores or updates the task-related metrics, the method 200 then displays the SERP, as previously discussed.

Figure 3:
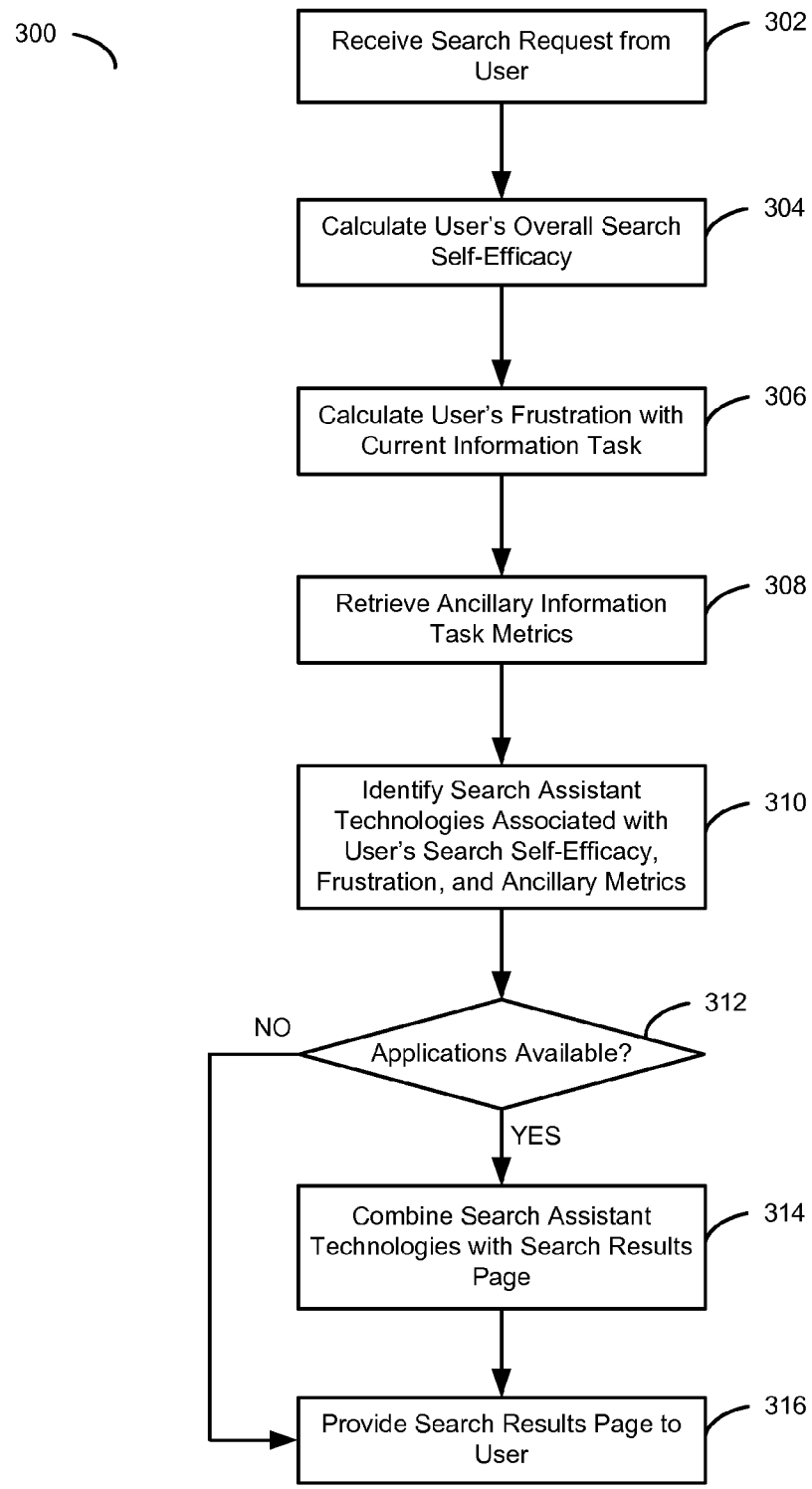
FIG. 3 presents a flow diagram illustrating a method for selecting and displaying one or more search assistance applications on the basis of collected user metrics according to one embodiment of the present invention.

FIG. 3 presents a flow diagram illustrating a method 300 for selecting and displaying a plurality of search assistance applications on the basis of collected user metrics according to one embodiment of the present invention. As the embodiment of FIG. 3 illustrates, the method 300 receives a search request from a user, step 302. In one embodiment, receiving a search request comprises a textual request for data in the form of a query string or POST HTTP header data.

The method 300 receives the user's search query and calculates the user's overall search self-efficacy, step 304. In one embodiment, calculating a user's search self-efficacy comprises analyzing a model based on indicators derived from the user's search and browsing patterns. In one embodiment, these search and browsing patterns are an aggregate measure of the user's self-efficacy. That is, the patterns are not limited to a specific information need, rather the patterns measure the user's overall search ability. In alternative embodiments, the search self-efficacy may be measured only with respect to the current information need.

The method 300 calculates the user's frustration with the current information task, step 306. In the illustrated embodiment, calculating the user's frustration comprises calculating the user's frustration solely for the current information need. In alternative embodiments, calculating a user's frustration may consider the user's overall search frustration. Calculating a user's frustration may include, but is not limited to, calculating the average number of URLs visited per information-seeking task by a user; the number of actions performed in the current task; the number of characters in the current query; the average length of search terms in the current query; the duration of the current information-seeking task, etc. It should also be noted that calculating a user's frustration may include combinations of the above-identified, or other, calculation.

The indication of self-efficacy and frustration may take various forms. For example, the self-efficacy and frustration levels may be represented as an integer or decimal number representing the level of self-efficacy and frustration. In alternative embodiments, the self-efficacy and frustration levels may be represented as complex rules such as "user often enters unnecessary keywords" and "user often is interested in the top two search results" or any other similar rules. The method 300 retrieves ancillary information task metrics, step 308. In the illustrated embodiment, ancillary information task metrics may comprise data such as the type of query, number of queries issued so far, elapsed time between queries, etc.

The method 300 retrieves the above-described metrics and identifies search assistance technologies associated with the user's search self-efficacy, frustration, and ancillary metrics, step 310. As previously discussed, retrieving search assistance applications may entail determining a plurality of highly effective applications and retrieving said applications from an application database. For example, the method 300 may determine that a user does not enter many query terms when he or she searches for information and that he or she does not spend much time per information-need searching. From these two measures of frustration, the method 300 may determine that the user may benefit from the "SneakPeek" application (to address the lack of time spent searching) and the "add popular terms" application (to address the lack of entered query terms). As can be seen, the method 300 may select a subset of the total number of available applications based upon the stored user metrics.

After identifying a plurality of applications, the method 300 determines if these applications are available, step 312. If not, the method 300 provides the search engine results page to the user, step 316. If the applications are available, the method 300 combines the search assistant technologies with the search engine results page, step 316. In the illustrated embodiment, the method 300 combines the applications with the previously identified search results (and advertisements) to form a SERP comprising both search results and the identified applications.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method comprising:
  receiving, via at least one computing device, a search query from a user;
  calculating, via the at least one computing device, the user's search self-efficacy;
  calculating, via the at least one computing device, the user's frustration with the current information task;
  identifying, via the at least one computing device, a plurality of search assistance applications, each search assistance application of the plurality of search assistance applications associated with a search self-efficacy and a frustration level;
  determining, via the at least one computing device, if one or more search assistance applications from the plurality of search assistance applications are available to assist the user on the basis of the calculated search self-efficacy and frustration level matching the search self-efficacy and frustration level associated with one or more search assistance applications;
  providing, via the at least one computing device, the user a search engine results page comprising a listing of search results, each listed search result is selectable by the user to access the selected search result item, and a listing of one or more search assistance applications determined to be available and determined to have an associated search self-efficacy and frustration level matching those calculated for the user, each search assistance application listed in the search engine results page is selectable by the user to execute the selected search assistance application.

2. The method of claim 1 wherein calculating the user's search self-efficacy comprises analyzing a model based on indicators derived from the user's search and browsing patterns.

3. The method of claim 2 wherein the user's search and browsing patterns comprises the user's overall search and browsing patterns.

4. The method of claim 2 wherein the user's search and browsing patterns comprises the user's search and browsing patterns for a current information task.

5. The method of claim 1 wherein calculating the user's frustration with the current information task comprises one or more of calculating the average number of URLs visited per information-seeking task by a user; calculating the number of actions performed in the current task; calculating the number of characters in the current query; calculating the average length of search terms in the current query; or calculating the duration of the current information-seeking task.

6. The method of claim 1 wherein identifying a plurality of search assistance applications based on the user's search self-efficacy and frustration further comprises identifying a plurality of search assistance applications based on ancillary task metrics.

7. The method of claim 6 wherein ancillary task metrics comprise one or more of the type of query, number of queries issued so far, time between queries.

8. The method of claim 1 wherein the user's search self-efficacy and frustration are calculated based on user metrics collected from a user's previous interactions with a search engine results page.

9. The method of claim 8 wherein the user metrics collected from a user's previous interactions with a search engine results page are collected by one of a client side browser extension, a web proxy, or a web server.

10. A system comprising:
  a plurality of client devices coupled to a network;
  a search engine coupled to the network operative to receive a search query from a client device;
  an efficacy and frustration calculator operative to calculate the user's search self-efficacy and calculate the user's frustration with the current information task;
  a search assistance application storage module operative to store a plurality of search assistance applications;
  a search assistance suggestion server operative to identify a plurality of search assistance applications, each of the plurality of search assistance applications associated with a search self-efficacy and a frustration level, and determine if one or more search assistance applications from the plurality of search assistance applications are available to assist the user on the basis of the calculated search self-efficacy and frustration level matching the search self-efficacy and frustration level associated with one or more search assistance applications; and a web server operative to provide a search engine results page comprising a listing of search results, each listed search result is selectable by the user to access the selected search result item, and a listing of one or more search assistance applications determined to be available and determined to have an associated search self-efficacy and frustration level matching those calculated for the user, each search assistance application listed in the search engine results page is selectable by the user to execute the selected search assistance application.

11. The system of claim 10 wherein the efficacy and frustration calculator is further operative to calculate a user's search self-efficacy by analyzing a model based on indicators derived from the user's search and browsing patterns.

12. The system of claim 11 wherein the user's search and browsing patterns comprises the user's overall search and browsing patterns.

13. The system of claim 11 wherein the user's search and browsing patterns comprises the user's search and browsing patterns for a current information task.

14. The system of claim 10 wherein the efficacy and frustration calculator is further operative to calculate a user's frustration with the current information task by calculating one or more of the average number of URLs visited per information-seeking task by a user; calculating the number of actions performed in the current task; calculating the number of characters in the current query; calculating the average length of search terms in the current query; or calculating the duration of the current information-seeking task.

15. The system of claim 10 wherein the search assistance suggestion server is further operative to identity a plurality of search assistance applications based on ancillary task metrics stored in a user metric storage module.

16. The system of claim 15 wherein the ancillary task metrics stored within the user metric storage module comprise one or more of the type of query, number of queries issued so far, time between queries.

17. The system of claim 10 wherein the efficacy and frustration calculator calculates a user's search self-efficacy and frustration based on user metrics collected from a user's previous interactions with a search engine results page.

18. The system of claim 17 wherein the search engine collects user metrics from a user's previous interactions with a search engine results page are collected by one of a client side browser extension, a web proxy, or a web server.

19. The method of claim 1, wherein the listing of the one or more search assistance applications of the search result page includes a link that when selected causes the selected search assistance application to be executed.

* * * * *